INVENTORS
GEORGE J. HANGGI &
CLARENCE C. SMITH

ATTORNEY

United States Patent Office 3,102,415
Patented Sept. 3, 1963

3,102,415
METHOD AND APPARATUS FOR FATIGUE TESTING TUBULAR PRODUCTS AND THE LIKE
George J. Hanggi and Clarence C. Smith, Ponca City, Okla., assignors to Continental Oil Company, Ponca City, Okla., a corporation of Delaware
Filed May 22, 1961, Ser. No. 111,740
9 Claims. (Cl. 73—37)

This invention relates to the pressure testing of hollow, cylindrical bodies. More particularly, but not by way of limitation, the present invention relates to a method and apparatus for hydrostatically fatigue testing tubular members such as steel pipe or the like.

The testing of vessels or containers which are designed to contain fluid under pressure is normally effected by filling the vessel with a hydraulic fluid, such as oil or water, and increasing the pressure which is imposed upon the fluid until the vessel is subjected to an internal pressure of such magnitude that a fiber stress is developed in the vessel which is slightly under the rated yield strength of the vessel. In the case of tubular members such as sections of pipe, the member is sealed at one of its ends and pressurized fluid is introduced at the other end. The pressure of the fluid in the pipe is increased to a magnitude which is only slightly less than the rated minimum yield strength required of the pipe. If there has been no structural failure of the pipe, the pressure is released and the fluid drained from the pipe and it is considered ready for service.

Although pressure tests of the nature described are of considerable value in providing an indication of whether the tested member is able to withstand a certain maximum load to which it will be subjected during service, such pressure tests are, in reality, static tests, and they therefore give no indication of the fatigue characteristics of the member being tested. Since a substantial proportion of the members which are subjected to such pressure tests are submitted in actual use to fluctuating loads, that is, loads of varying magnitude, during their service life, it is highly desirable that some indication be obtained of the fatigue properties of such members. Thus, although a given vessel or tubular member may easily withstand the maximum pressure imposed during the static pressure test and expected to prevail during the service life of the member, the fatigue characteristics of the member may be such that it will fail quite early when subjected to rapidly pulsating loads varying between extremely high and relatively low pressures.

The present invention provides a method and apparatus for pressure testing vessels and tubular members to determine their ability to withstand extremely high internal pressures, and, in addition, to determine the fatigue characteristics of the vessel when subjected to pulsating pressure conditions. In one of its broader aspects, the invention comprises a method of pressure testing containers by introducing a fluid to the interior of the container, and then periodically increasing the pressure of the fluid to develop a fiber stress slightly under the rated minimum yield strength of the vessel, and, alternately, periodically reducing the pressure of the fluid to a magnitude well below that required to develop such fiber stress. Stated differently, the method broadly, comprises subjecting a vessel or tubular member to be tested to pulsating pressure loads applied internally of the tested member, with such pulsations being repeated until the tested member fails. As an ancillary, but important, aspect of the invention, the number of pulsations to which the tested member has been subjected prior to its failure are counted and registered. In this way, the fatigue characteristic of the member may be determined.

For performing the method of the invention, a novel pressure testing apparatus has been developed and broadly comprises a suitable pump for pressurizing a fluid in the member to be tested, means for developing a pulsating pressure in said fluid, means for deenergizing the fluid pump upon structural failure of the tested member, and a counting device for counting and registering the number of pulsations to which the member is subjected prior to its failure. In a preferred embodiment of the invention, the apparatus employed for conducting the novel pressure tests also includes a protective housing surrounding the vessel or tubular member being tested. If desired, the protective housing may easily be temperature and atmosphere controlled to more closely simulate conditions to actually be encountered during the service life of the tested member. The testing apparatus is fully automatic in its operation, it being only necessary for an operator to connect the member to be tested to the pressure line leading from the fluid pump of the apparatus and to push a button closing an electrical circuit to commence the pressure testing operation. Shutdown of the fluid pump upon structural failure of the tested member is entirely automatic, as is the registration of the number of pulsations to which the tested member is subjected.

From the foregoing discussion, it will be perceived that a major object of the present invention is to provide a method for fatigue testing vessels, containers, tubular products and the like.

It is an additional object of the present invention to provide a pressure test for containers and tubular members, by which test the ability of the tested member to withstand a certain maximum pressure is determined and, in addition, its fatigue characteristic, or ability to withstand a series of pulsating pressure loads, may also be determined.

An additional object of the present invention is to provide a method for pressure testing containers in a manner which simulates very closely the load conditions to which the container is subjected in actual service.

A further object of the present invention is to provide a compact, relatively simple apparatus for pressure testing containers, including tubular members such as pipe, which apparatus is sufficiently compact and simple to permit its being made portable by mounting upon a mobile carriage.

A further object of the present invention is to provide an apparatus for pressure testing containers and the like, which apparatus is of relatively simple and inexpensive construction, but which nevertheless is structurally strong and possessed of a long and trouble-free operating life.

In addition to the previously cited objections and advantages, other equally important advantages characterize the present invention and will be discerned by the reader from the following disclosure when considered in conjunction with the accompanying drawings which illustrate the invention:

Figure 1:
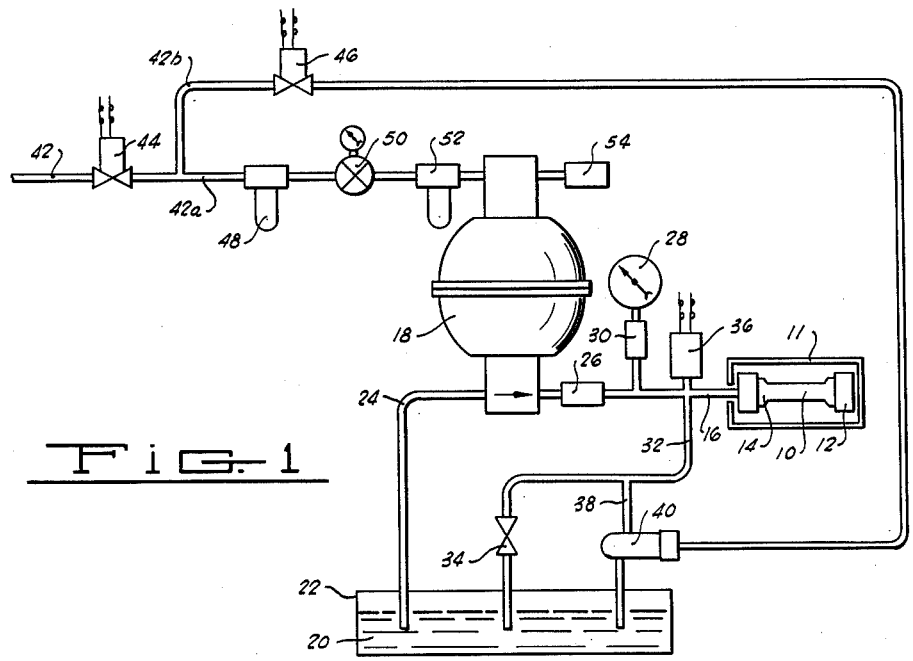
FIGURE 1 is a schematic diagram of the pressure testing apparatus of the present invention.

Referring now to the drawings in detail, and particularly to FIG. 1, reference character 10 designates a tubular member to be pressure tested by the method and apparatus of the present invention. For safety, the tubular member 10 is enclosed in a protective housing 11. The tubular member 10 is sealed by a cap 12 at one of its ends and its other end 14 is connected to a conduit 16 which leads to a fluid pump 18. Although a number of pumps will be found suitable for performing the method of the present invention, we prefer to employ the air-driven, piston-type pump illustrated in the preferred embodiment shown in FIG. 1.

A suitable hydraulic testing fluid 20, such as oil or water, is contained in a sump or reservoir 22 and passes to the pump 18 through a feed line 24. After the hydraulic fluid 20 is discharged from the pump 18 into the conduit 16, it passes through a restrictor 26 and acts upon a pressure gauge 28 which is protectively connected through another restrictor 30 to the conduit 16. A bleed line 32 is connected to the conduit 16 between the pressure gauge 28 and the tubular member 10 to allow the hydraulic fluid to be drained back into the sump 22 by opening a bleed valve 34 when the test has been completed. Also connected to the conduit 16 between the pressure gauge 28 and the tubular member 10 is a pressure switch 36, the function of which will be subsequently explained. A bypass conduit 38 is provided for placing the upstream portion of the bleed line 32 in communication with the sump 22 and bypassing the flow of hydraulic fluid around the bleed valve 34. An air-actuated, pressure release valve 40, the function of which is hereinafter described, is interposed in the bypass conduit 38.

Air for actuating the air-driven, piston-type pump 18 is introduced from a suitable air supply into a conduit 42 and initially passes through a normally closed two-way solenoid valve 44 located in conduit 42. Downstream from the solenoid valve 44, the conduit 42 branches with a portion of the air supply being directed through conduit 42a and the remainder passing through conduit 42b. The conduit 42b is connected to the air-actuated, pressure release valve 40 through a normally closed three-way solenoid valve 46. The air in conduit 42a is filtered by a suitable filtering device 48 and is then passed through an appropriate pressure regulator 50 where its pressure may be adjusted for optimum pump operation. Since it is desirable that a small amount of lubricant be entrained in the air entering the pump 18, a lubricator 52 is interposed in the conduit 42a between the pressure regulator 50 and the pump 18. Finally, the air exhausted from the pump 18 is discharged to the atmosphere through a suitable muffler or silencer 54.

Figure 2:
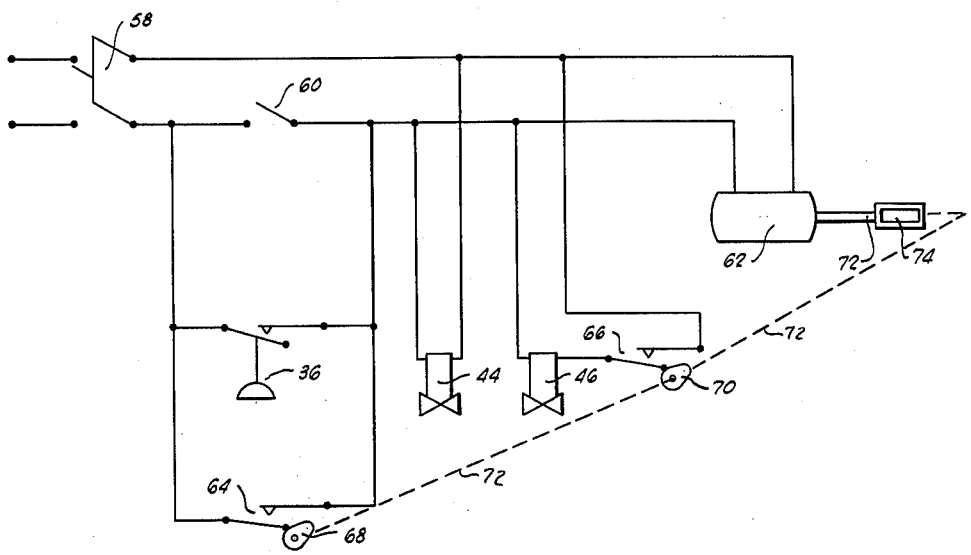
FIGURE 2 is a wiring diagram of the electrical circuitry used in the apparatus of the present invention.

The electrical circuitry which includes the solenoid valves 44 and 46 and the pressure switch 36, all shown in FIG. 1, is illustrated in the FIG. 2 wiring diagram. A main switch 58 is closed to connect the apparatus to a suitable source of electrical power. The circuit contains a push-button switch 60 which is connected in series with a suitable timing motor 62 and in parallel with the pressure switch 36 and a cam-actuated switch 64. The solenoid valve 46 and a second cam-actuated switch 66 are both connected in parallel with the timing motor 62. Finally, the solenoid valve 44 is connected in the circuit in parallel with the timing motor 62 and the solenoid valve 46 and in series with the push-button switch 60.

The cams which are employed to actuate switches 64 and 66 are designated by reference characters 68 and 70, respectively, and are attached to the shaft 72 of the timing motor 62. A suitable counter 74 cooperates with the end of the timing motor shaft 72 for registering the number of revolutions thereof.

*Operation*

In utilizing the depicted apparatus for performing the method of the present invention, a test specimen such as the tubular member 10 is first capped and placed inside the protective housing 11. One end 14 of the tubular member 10 is, of course, connected to the hydraulic fluid line 16 through a suitable adaptor. To commence the operation of the apparatus, the main switch 58 is first closed and then the push-button switch 60 is held down to commence the cycle of pressure pulsations. When the push-button switch 60 is depressed, the circuit is completed through solenoid valve 44 which therefore opens to admit pressurized air to the system depicted in FIG. 1. In passing to the pump 18, the air passes through the filter 48 and into the air regulator 50 where its pressure may be adjusted as desired to obtain the performance of pump 18 necessary to raise the pressure of the hydraulic fluid in the tubular member 10 to the desired value. The air in the conduit 42a then passes through the lubricator 52 and into the piston-type pump 18. As has previously been explained, air exhausted from the pump is vented to the atmosphere through a muffler or silencer 54. When the solenoid valve 44 is opened, a portion of the air introduced via conduit 42 will also enter the conduit 42b and pass to the solenoid valve 46.

When the pump 18 is actuated, it draws the hydraulic testing fluid from the sump 22 and pressurizes it according to the pressure of the air directed to the pump in accordance with the setting of the pressure regulator 50. The pressurized hydraulic fluid flows through the restrictor 26 and also acts on the pressure gauge 28 through a restrictor 30 so that damage to the pressure gauge is prevented when the pressure in the conduit 16 is suddenly released in the manner subsequently explained. With the pump 18 in operation and the pressure release valve 40 and bleed valve 34 closed, the pressure of fluid in the tubular member 10 will commence to increase. Since a relatively small pressure will close the pressure switch 36, the push-button switch 60 may soon be released and the circuit to the timing motor 62 and solenoid valve 44 will be maintained through the pressure switch 36.

At the instant the push-button switch 60 is depressed and during the maintained closure of the circuit by the pressure switch 36, the timing motor 62 commences and continues to rotate. As the timing motor 62 rotates, the cam 68 on the shaft 72 thereof is also rotated to close the cam-actuated switch 64. Immediately after the cam-actuated switch 64 is closed, the cam 70 operates to close the cam-actuated switch 66. The speed of rotation of the motor 62 and shape of cams 68 and 70 are such that by the time the cam-actuated switches 64 and 66 are closed, the member being tested will be loaded to the predetermined pressure. However, at the instant the cam-actuated switch 66 is closed, the circuit is completed through the solenoid valve 46 causing this valve to open and permitting air to proceed through the conduit 42b to the air-actuated pressure release valve 40. With the opening of the normally closed pressure release valve 40, the pressurized hydraulic fluid in the conduit 16 and the tubular member 10 may be discharged via the bleed line 32 and bypass conduit 38 into the sump 22. The pressure in the tubular member 10 is thus allowed to drop sharply. With the lowering of the pressure in the conduit 16, the pressure switch 36 is reopened. However, the circuit to the solenoid valve 44 and the timing motor 62 is maintained by virtue of the closure of cam-actuated switch 64, and the design of the cam 68 is such that the switch 64 will remain closed until such time as the cam 70 has allowed cam-actuated switch 66 to reopen, thus causing normally closed solenoid valve 46 to reclose and block the passage of air to the pressure release valve 40. As pressure release valve 40 recloses, the pressure of hydraulic fluid in the conduit 16 and tubular member 10 again begins to build up so that the pressure switch 36 is reclosed to maintain the circuit. The cam 68 then allows the cam-actuated switch 64 to reopen and the cycle of pressure pulsation has been completed.

The described cycle of operation involving a buildup and a decrease in the pressure of hydraulic fluid within the tested member continues to repeat itself until a structural failure of the specimen occurs. When such a fatigue failure occurs, the release of pressure which results will cause the pressure switch 36 to open. Unless the structural failure happens to occur at a time when the cam-actuated switch 64 is closed, the opening of the pressure switch 36 will effectively open the circuit to the solenoid valve 44 and the timing motor 62, thus allowing the solenoid valve 44 to close and the timing motor to be de-energized. The closure of the solenoid valve 44 will, of course, cut off the supply of air to the motor 18 so that on further injection of pressurized hydraulic fluid into the tested member occurs. If, by chance, the failure occurs just prior to or during normal pressure release, operation will continue for a few seconds because the cam-operated switch 64 will be closed at that time. The timing motor 62 will, in such case, continue to rotate the cam 68 until the cam-actuated switch 64 is opened to stop the operation of the apparatus.

From the foregoing description, it will be apparent that the method and apparatus of the present invention provide a highly useful testing procedure for determining the fatigue properties of hollow containers and tubular members. Every advantage of the previous pressure tests of the static type is realized, since the tested member is subjected to extremely high loading during a test by the present method, and, in addition, accurate evaluation of its fatigue and endurance characteristics is ascertained from the technique employed. A count of the number of pulsations to which the tested member is subjected is constantly registered by the counter 74. Also, the apparatus is quickly and automatically shut down upon structural failure of the member being tested so that excessive loss of hydraulic testing fluid does not occur and the apparatus may be operated with a relatively high degree of safety. The use of the protective housing around the article being tested not only enhances the safety with which the testing operation is conducted, but, in addition, enables the actual service conditions to which the tested article is to be subjected to be more accurately simulated during the test.

Although but a single preferred embodiment of this invention has been illustrated and described hereinbefore, it will be understood that changes and modifications in the apparatus and procedure described may be made without departing from the spirit of the invention or the scope of the appended claims.

We claim:

1. Apparatus for pressure testing a container comprising means for periodically increasing and, alternately, reducing the pressure of a fluid in said container; a means for automatically de-energizing said pressure increasing means upon failure of said container, wherein said de-energizing means comprises a normally closed solenoid valve preventing operation of said pressure increasing means when closed; pressure-actuated switch means responsive to the pressure of fluid in said vessel to open said solenoid valve when the pressure of said fluid exceeds a predetermined value, and inoperative when the pressure of said fluid is less than said predetermined value; timing means synchronized with the period of pressure fluctuations induced in said fluid by said pressure increasing means; and second switch means responsive to said timing means to open said solenoid valve during the portion of the pressure decreasing phase of operation of the pressure increasing means when said pressure-actuated switch means is inoperative whereby when the pressure of said fluid is decreased solely as a result of the failure of said container, said solenoid valve closes and said pressure increasing means is deactuated.

2. Apparatus as claimed in claim 1 wherein said pressure increasing means comprises a fluid pump for introducing fluid to said container; a pressure release valve cooperating with said pump in controlling the pressure of fluid in said container; and timing motor means periodically opening and, alternately, closing said pressure release valve to alternately decrease and increase the pressure of the fluid in said container, respectively; and wherein said timing means comprises a cam connected to the shaft of said motor for closing said second switch means when said pressure release valve is opened by said motor and for opening said second switch means when said pressure release valve is closed by said motor.

3. Apparatus for fatigue testing a container comprising a fluid pump; conduit means connected between said pump and said container for conveying fluid into said container from said pump; a pressure release valve in said conduit means for releasing pressurized fluid from said conduit means; and a timing motor operably connected to said pressure release valve and said conduit means for periodically opening and, alternately, closing said pressure release valve whereby the pressure of fluid in said container is alternately increased and decreased.

4. Apparatus for pressure testing a container comprising a fluid-driven pump; a source of motive fluid for driving said pump; a supply of testing fluid to be pumped by said pump; first conduit means connecting said source of motive fluid to said pump; second conduit means connecting said pump to the container for conveying pumped testing fluid from said pump to said container; a pressure release line connected to said second conduit means for releasing a portion of the pressurized testing fluid therefrom; a fluid-actuated, normally closed pressure release valve in said pressure release line; a conduit interconnecting said first conduit means with said pressure release valve; normally closed valve means in said conduit; and means for periodically opening said normally closed valve means whereby said pressure release valve is periodically and alternately opened and closed to produce fluctuations in the pressure of the testing fluid introduced into said container via said second conduit means.

5. Apparatus for pressure testing a container as claimed in claim 4 wherein said normally closed valve means is a solenoid valve; and wherein said means for periodically opening said normally closed valve means comprises an electrical circuit including said solenoid valve; a timing motor in said circuit connected in parallel with said solenoid valve; a normally open switch connected in series with said solenoid valve; and cam means associated with said timing motor for periodically closing said normally open switch to complete the circuit through said normally closed solenoid valve.

6. Apparatus for pressure testing a container as claimed in claim 5 and further characterized to include means for automatically deactuating said pump when a structural failure develops in said container.

7. Apparatus for pressure testing a container as claimed in claim 6 wherein said automatically deactuating means comprises a second solenoid valve in said circuit connected in parallel with said timing motor and disposed in said first conduit means for stopping the flow of motive fluid to said pump when said second solenoid valve is closed; a pressure-actuated switch responsive to the pressure of testing fluid in said container to close the circuit to said second solenoid valve when the pressure in said container exceeds a predetermined value; a second normally open switch connected in parallel with said pressure-actuated switch; and second cam means associated with said timing motor and cooperating with said second normally open switch to close said second normally open switch when said first cam means closes said first normally open switch whereby said second solenoid valve is closed to prevent motive fluid from passing to said pump only when the pressure in said container drops as a result solely of the structural failure thereof.

8. Apparatus for pressure testing a container as claimed in claim 7 and further characterized to include a counter connected to said timing motor for registering the number of revolutions of the shaft of said motor which occur prior to structural failure of the container.

9. Apparatus for pressure testing a container as claimed in claim 7 and further characterized to include a protective housing enclosing said container during the testing thereof.

References Cited in the file of this patent

UNITED STATES PATENTS

| | | | |
|---|---|---|---|
| 2,170,640 | Kenyon | Aug. 22, | 1939 |
| 2,725,742 | Crooks | Dec. 6, | 1955 |

FOREIGN PATENTS

| | | | |
|---|---|---|---|
| 712,308 | France | July 20, | 1931 |
| 404,107 | Great Britain | Jan. 11, | 1934 |